United States Patent
Lee et al.

(10) Patent No.: US 11,677,594 B1
(45) Date of Patent: Jun. 13, 2023

(54) RECEIVER AND AUTOMATIC OFFSET CANCELLATION METHOD THEREOF

(71) Applicant: Novatek Microelectronics Corp., Hsinchu (TW)

(72) Inventors: Tien-Chien Lee, Hsinchu County (TW); Chao-Kai Tu, Hsinchu (TW); Sheng Hao Tseng, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/706,632

(22) Filed: Mar. 29, 2022

(51) Int. Cl.
*H04L 25/03* (2006.01)
*H04L 25/02* (2006.01)
*H04L 25/06* (2006.01)

(52) U.S. Cl.
CPC ...... *H04L 25/0328* (2013.01); *H04L 25/0272* (2013.01); *H04L 25/061* (2013.01)

(58) Field of Classification Search
CPC ......... H04L 25/03828; H04L 25/03006; H04L 25/0272; H04L 25/061; H04L 25/085; H04L 25/03; H04L 27/06; H04L 25/12; H04L 25/06
See application file for complete search history.

(56) References Cited

U.S. PATENT DOCUMENTS

| | | | |
|---|---|---|---|
| 6,288,604 B1 | 9/2001 | Shih | |
| 7,826,522 B2* | 11/2010 | Sumesaglam | H04B 3/143 375/232 |
| 10,033,524 B1 | 7/2018 | Siddaiah | |
| 2006/0176975 A1* | 8/2006 | Hsieh | H04B 1/30 375/285 |
| 2007/0115048 A1* | 5/2007 | Mansuri | H03F 3/45744 330/9 |
| 2014/0266440 A1* | 9/2014 | Itagaki | H03F 1/26 330/254 |

OTHER PUBLICATIONS

"Office Action of Taiwan Counterpart Application", dated Nov. 30, 2022, p. 1-p. 7.

* cited by examiner

*Primary Examiner* — Khanh C Tran
(74) *Attorney, Agent, or Firm* — JCIPRNET

(57) ABSTRACT

The disclosure provides a receiver and an automatic offset cancellation (AOC) method thereof. The receiver includes a receiving channel circuit and an AOC circuit. The receiving channel circuit generates an equalized differential signal including an equalized first-end signal and an equalized second-end signal according to an input differential signal. The AOC circuit detects a peak of the equalized first-end signal to generate a first peak detection result. The AOC circuit detects a peak of the equalized second-end signal to generate a second peak detection result. The AOC circuit compares the first peak detection result with the second peak detection result to generate a comparison result. The AOC circuit compensates a mismatch of an input differential pair in the receiving channel circuit according to the comparison result.

32 Claims, 13 Drawing Sheets

RECEIVER AND AUTOMATIC OFFSET CANCELLATION METHOD THEREOF

BACKGROUND OF THE INVENTION

Field of the Invention

The disclosure relates to an electronic circuit, and more particularly, to a receiver and an automatic offset cancellation method thereof.

Description of Related Art

A transmitter may transmit a differential signal to a receiver via a transmission channel (such as a wire). Due to the design limitation of electromagnetic interference (EMI) and power consumption, the swing of the differential signal of the transmitter to the receiver gets smaller and smaller. Therefore, the jitter of the equalized differential signal generated by the receiver gets larger and larger (due to the mismatch of the input differential pair of the receiving channel circuit), thus resulting in poor receiver yield. Ways in the prior art to improve receiver yield include increasing the size of the input differential pair. However, increasing the size of the input differential pair results in bandwidth degradation, which in turn requires the use of a larger bias current.

SUMMARY OF THE INVENTION

The disclosure provides a receiver and an automatic offset cancellation (AOC) method thereof to compensate a mismatch of an input differential pair in a receiving channel circuit.

In an embodiment of the disclosure, a receiver includes a receiving channel circuit and an AOC circuit. The receiving channel circuit is configured to generate an equalized differential signal according to an input differential signal. The AOC circuit is coupled to the receiving channel circuit to receive the equalized differential signal. The equalized differential signal includes an equalized first-end signal and an equalized second-end signal. The AOC circuit detects a peak of the equalized first-end signal to generate a first peak detection result. The AOC circuit detects a peak of the equalized second-end signal to generate a second peak detection result. The AOC circuit compares the first peak detection result with the second peak detection result to generate a comparison result. The AOC circuit compensates a mismatch of an input differential pair in the receiving channel circuit according to the comparison result.

In an embodiment of the disclosure, the AOC method includes: generating an equalized differential signal according to an input differential signal via a receiving channel circuit, wherein the equalized differential signal includes an equalized first-end signal and an equalized second-end signal; detecting a peak of the equalized first-end signal via an AOC circuit to generate a first peak detection result; detecting a peak of the equalized second-end signal via the AOC circuit to generate a second peak detection result; comparing the first peak detection result with the second peak detection result via the AOC circuit to generate a comparison result; and compensating a mismatch of an input differential pair in the receiving channel circuit according to the comparison result via the AOC circuit.

In an embodiment of the disclosure, a receiver includes a receiving channel circuit and an AOC circuit. The receiving channel circuit is configured to generate an equalized differential signal according to an input differential signal. The AOC circuit is coupled to the receiving channel circuit to receive the equalized differential signal. The equalized differential signal includes an equalized first-end signal and an equalized second-end signal. The AOC circuit compares the equalized first-end signal with the equalized second-end signal to generate a comparison result. The AOC circuit compensates a mismatch of an input transistor pair in an input stage of an equalization (EQ) filter of the receiving channel circuit according to the comparison result. The input transistor pair includes a first input transistor and a second input transistor. The input stage further includes a first redundant transistor, a second redundant transistor, a first switch, a second switch, a third switch, a fourth switch, a fifth switch, and a sixth switch. A first end and a second end of the first redundant transistor are respectively coupled to a first end and a second end of the first input transistor. A first end and a second end of the second redundant transistor are respectively coupled to a first end and a second end of the second input transistor. A first end and a second end of the first switch are respectively coupled to a control end of the first input transistor and a first voltage. A first end and a second end of the second switch are respectively coupled to a control end of the second input transistor and the first voltage. A first end and a second end of the third switch are respectively coupled to a control end of the first redundant transistor and the first voltage. A first end and a second end of the fourth switch are respectively coupled to the control end of the first redundant transistor and a second voltage. A first end and a second end of the fifth switch are respectively coupled to a control end of the second redundant transistor and the first voltage. A first end and a second end of the sixth switch are respectively coupled to the control end of the second redundant transistor and the second voltage.

Based on the above, the AOC circuit of an embodiment of the disclosure may detect the peaks of the first-end signal and the second-end signal in the equalized differential signal to generate the first peak detection result and the second peak detection result. After the first peak detection result and the second peak detection result are compared, when the peak of the equalized first-end signal is approximately equal to the peak of the equalized second-end signal, the input differential pair of the receiving channel circuit may be considered matched to each other. When the peak of the equalized first-end signal is greater (or less) than the peak of the equalized second-end signal, the AOC circuit may compensate the mismatch of the input differential pair in the receiving channel circuit until the peak of the equalized first-end signal is approximately equal to the peak of the equalized second-end signal.

In order to make the aforementioned features and advantages of the disclosure more comprehensible, embodiments accompanied with figures are described in detail below.

DESCRIPTION OF THE EMBODIMENTS

Figure 1:
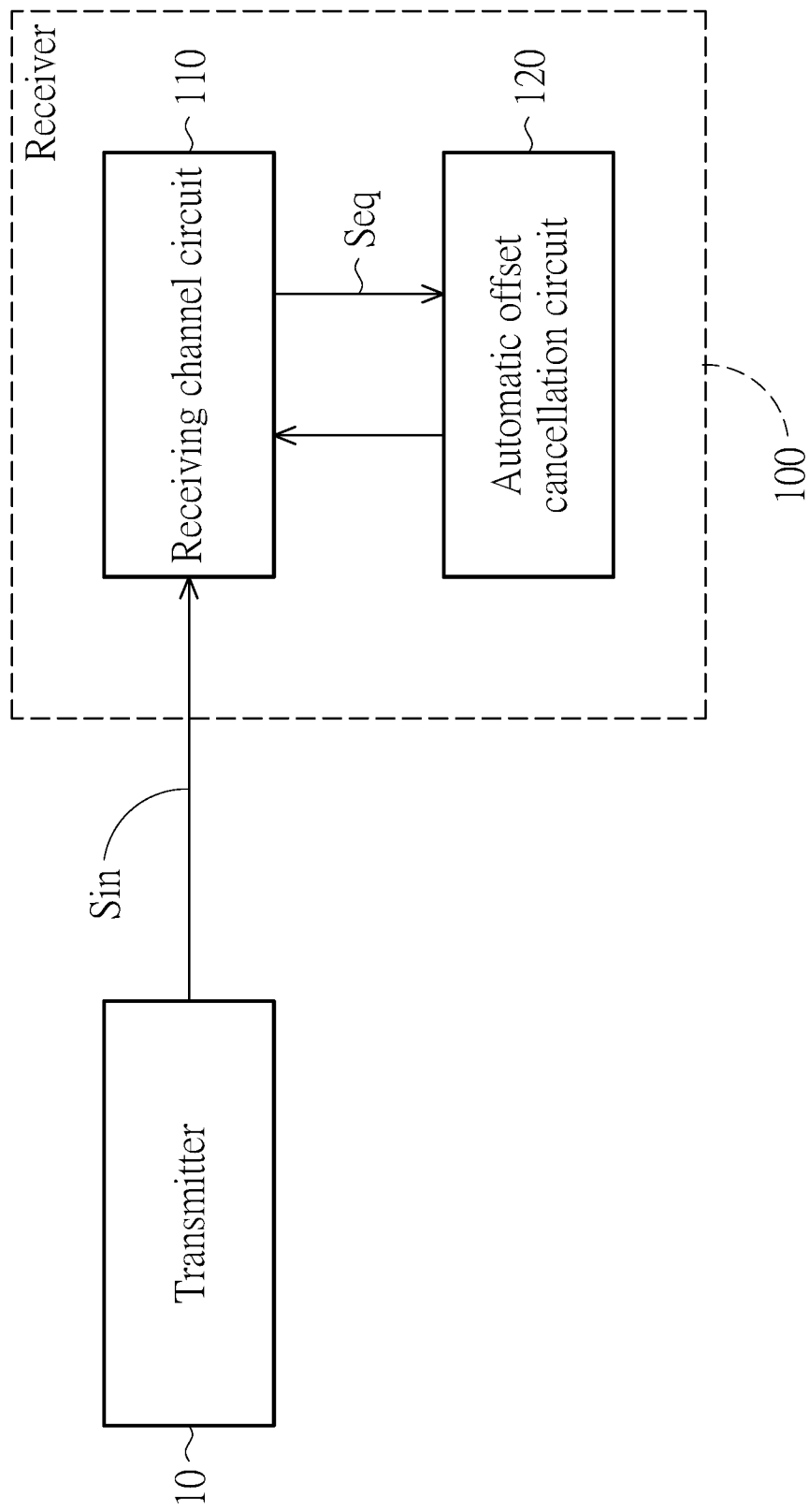
FIG. 1 is a circuit block diagram of a receiver according to an embodiment of the disclosure.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

FIG. 1 is a circuit block diagram of a receiver 100 according to an embodiment of the disclosure. A transmitter 10 may transmit the differential signal (e.g., an input differential signal Sin) to the receiver 100 via a transmission channel (e.g., a wire). The receiver 100 includes a receiving channel circuit 110 and an automatic offset cancellation (AOC) circuit 120. The receiving channel circuit 110 may generate an equalized differential signal Seq according to the input differential signal Sin.

In the receiving channel circuit 110, an input differential pair (i.e., two input transistors paired with each other, not shown in FIG. 1) may not match each other. In some embodiments, the input differential pair may be an input transistor pair in an input stage (not shown in FIG. 1) of an equalization (EQ) filter of the receiving channel circuit 110. In other embodiments, the input differential pair may be the input transistor pair of any circuit (e.g., amplifier, buffer, etc.) in the receiving channel circuit 110. Due to the design limitation of electromagnetic interference (EMI) and power consumption, the swing of the input differential signal Sin of the transmitter 10 to the receiver 100 gets smaller and smaller. Therefore, the jitter of the equalized differential signal Seq generated by the receiving channel circuit 110 gets larger and larger (due to the mismatch of the input differential pair of the receiving channel circuit 110).

The AOC circuit 120 is coupled to the receiving channel circuit 110 to receive the equalized differential signal Seq. The AOC circuit 120 may detect the peak of the equalized differential signal Seq and compensate the mismatch of one (or a plurality of) input differential pairs in the receiving channel circuit 110 according to the peak of the equalized differential signal Seq. After the mismatch of the input differential pair is compensated, the jitter situation of the equalized differential signal Seq may be effectively alleviated.

Figure 2:
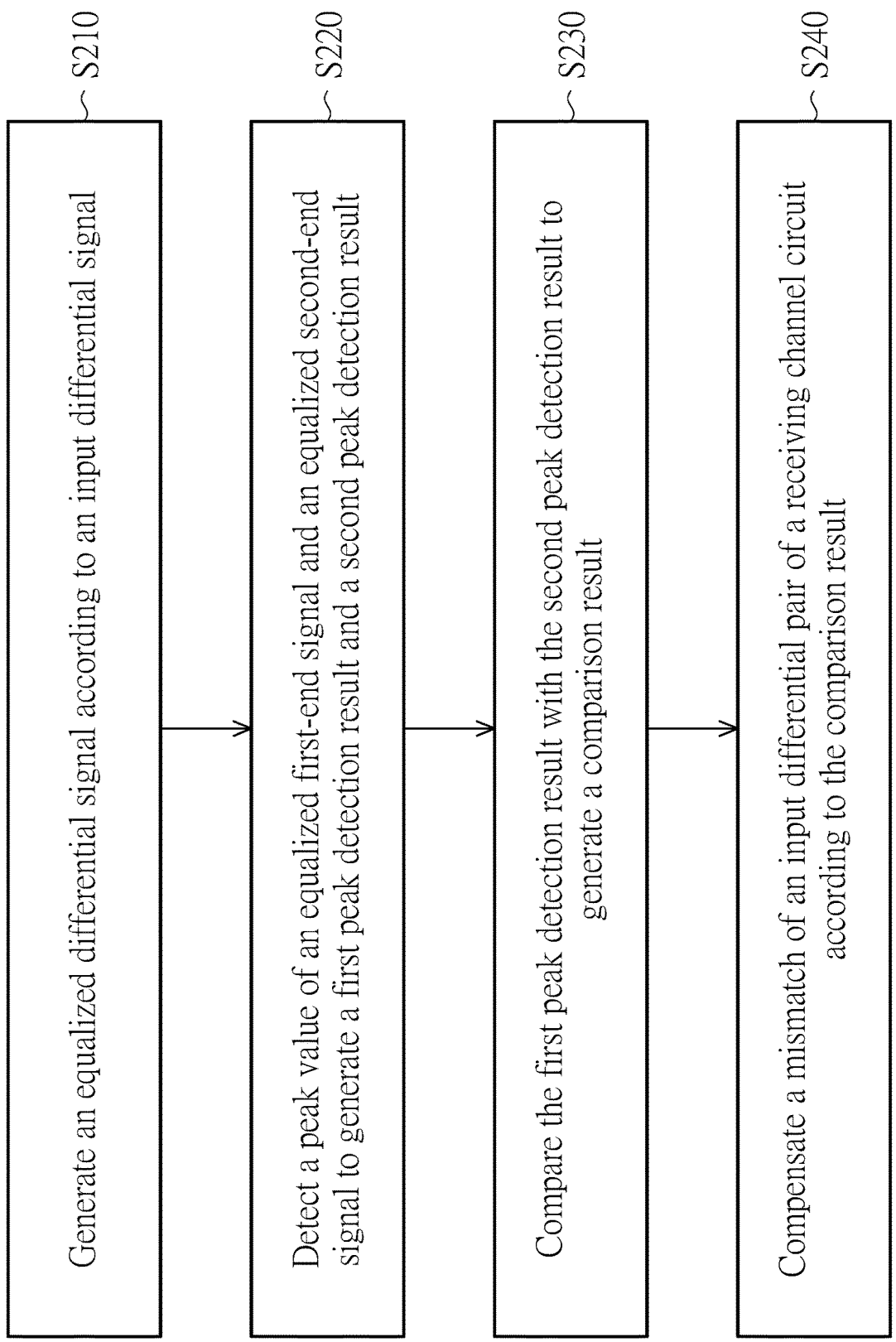
FIG. 2 is a flowchart of an automatic offset cancellation (AOC) method according to an embodiment of the disclosure.

FIG. 2 is a flowchart of an AOC method according to an embodiment of the disclosure. Please refer to FIG. 1 and FIG. 2. In step S210, the receiving channel circuit 110 may generate the equalized differential signal Seq according to the input differential signal Sin, wherein the equalized differential signal Seq includes an equalized first-end signal and an equalized second-end signal. In step S220, the AOC circuit 120 may detect the peak of the equalized first-end signal to generate a first peak detection result, and detect the peak of the equalized second-end signal to generate a second peak detection result. According to actual design, in some embodiments, the peak may be the crest peak of the equalized first-end signal (or the equalized second-end signal). In some other embodiments, the peak may be a trough peak of the equalized first-end signal (or the equalized second-end signal).

In step S230, the AOC circuit 120 may compare the first peak detection result with the second peak detection result to generate a comparison result. When the input differential pair of the receiving channel circuit 110 is approximately matched with each other, the peak of the equalized first-end signal (the first peak detection result) is approximately equal to the peak of the equalized second-end signal (the second peak detection result). If the input differential pair is perfectly matched, the peak of the equalized first-end signal is equal to the peak of the equalized second-end signal. When the threshold voltage (generally labeled Vth) of the first input transistor in the input differential pair is greater than the threshold voltage Vth of the second input transistor in the input differential pair, the peak of the equalized first-end signal is greater than the peak of the equalized second-end signal. When the threshold voltage Vth of the first input transistor is less than the threshold voltage Vth of the second input transistor, the peak of the equalized first-end signal is less than the peak of the equalized second-end signal.

In step S240, the AOC circuit 120 may compensate the mismatch of the input differential pair in the receiving channel circuit 110 according to the comparison result of step S230. The present embodiment does not limit the specific compensation method for the mismatch of the input differential pair. For example (but not limited thereto), the AOC circuit 120 may choose to compensate (increase) the bias current of the first input transistor or the second input transistor in the input differential pair according to the comparison result of step S230 to compensate the mismatch of the input differential pair. Specifically, when the comparison result indicates the first peak detection result is greater than the second peak detection result, the AOC circuit 120 may increase the bias current of the first input transistor; and when the comparison result indicates the first peak detection result is less than the second peak detection result, the AOC circuit 120 may increase the bias current of the second input transistor.

Based on the above, the AOC circuit 120 of the present embodiment may detect the peaks of the first-end signal and the second-end signal in the equalized differential signal Seq to generate the first peak detection result and the second peak detection result. After the first peak detection result and the second peak detection result are compared, when the peak of the equalized first-end signal is approximately equal to the peak of the equalized second-end signal, the AOC circuit 120 may consider the input differential pair in the receiving channel circuit 110 to be matched to each other. When the peak of the equalized first-end signal is greater (or less) than the peak of the equalized second-end signal, the AOC circuit 120 may compensate the mismatch of the input differential pair in the receiving channel circuit 110 until the peak of the equalized first-end signal is approximately equal to the peak of the equalized second-end signal.

Figure 3:
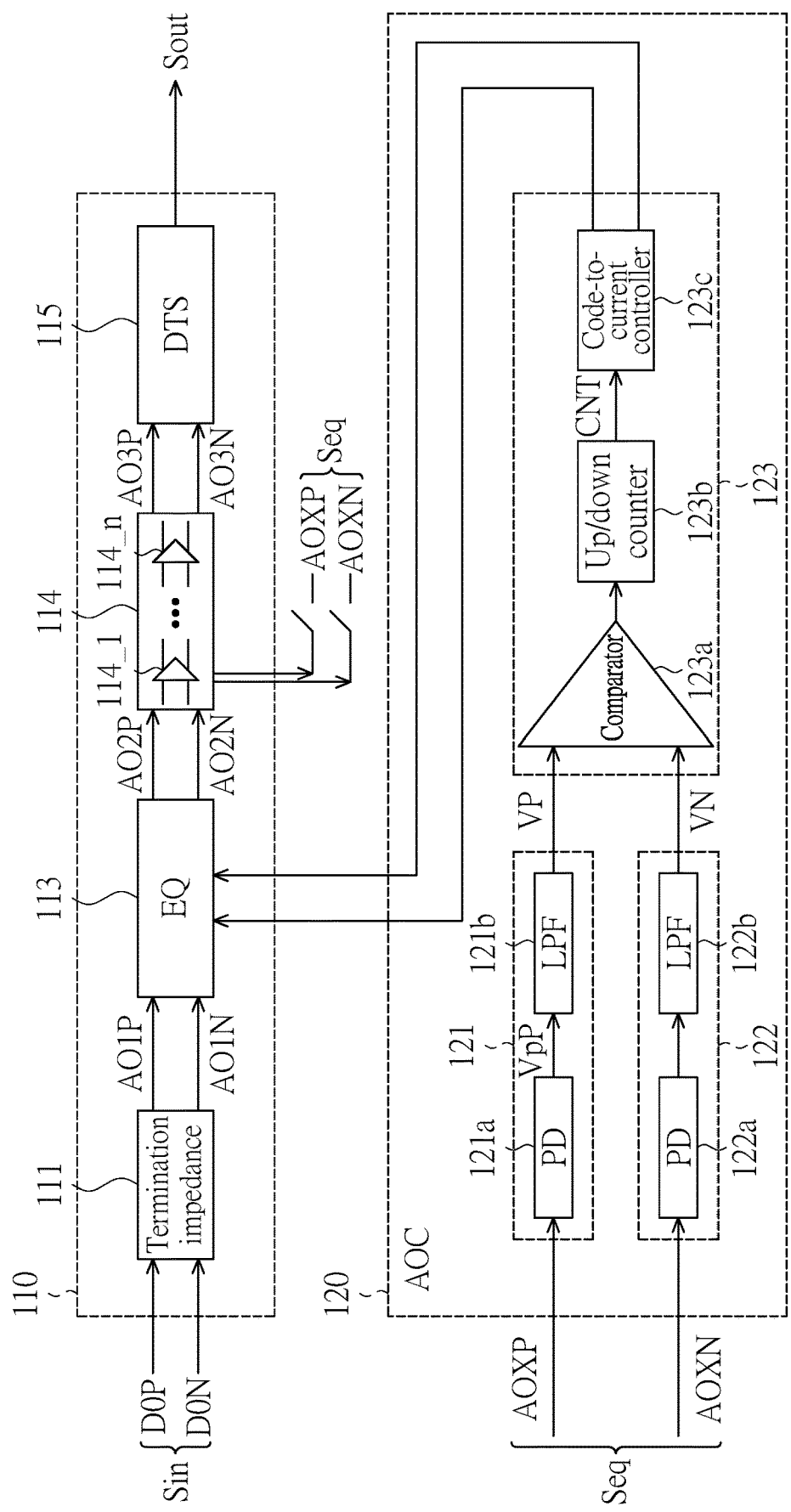
FIG. 3 is a circuit block diagram of a receiving channel circuit and an AOC circuit according to an embodiment of the disclosure.

FIG. 3 is a circuit block diagram of the receiving channel circuit 110 and the AOC circuit 120 according to an embodiment of the disclosure. In the embodiment shown in FIG. 3, the receiving channel circuit 110 includes a termination impedance matching circuit 111, an EQ filter 113, a current mode logic (CML) buffer string 114, and a differential-to-single (DTS) buffer 115.

In the embodiment shown in FIG. 3, the input differential signal Sin includes a first-end signal D0P and a second-end signal DON. The EQ filter 113 may receive the input differential signal Sin via the termination impedance matching circuit 111 (i.e., receive a first-end signal AO1P and a second-end signal AO1N shown in FIG. 3). The input differential pair may be an input transistor pair in the input stage of the EQ filter 113. The EQ filter 113 shown in FIG. 3 may be any EQ circuit. For example, the EQ filter 113 may include a conventional EQ filter or other EQ circuits.

Figure 4:
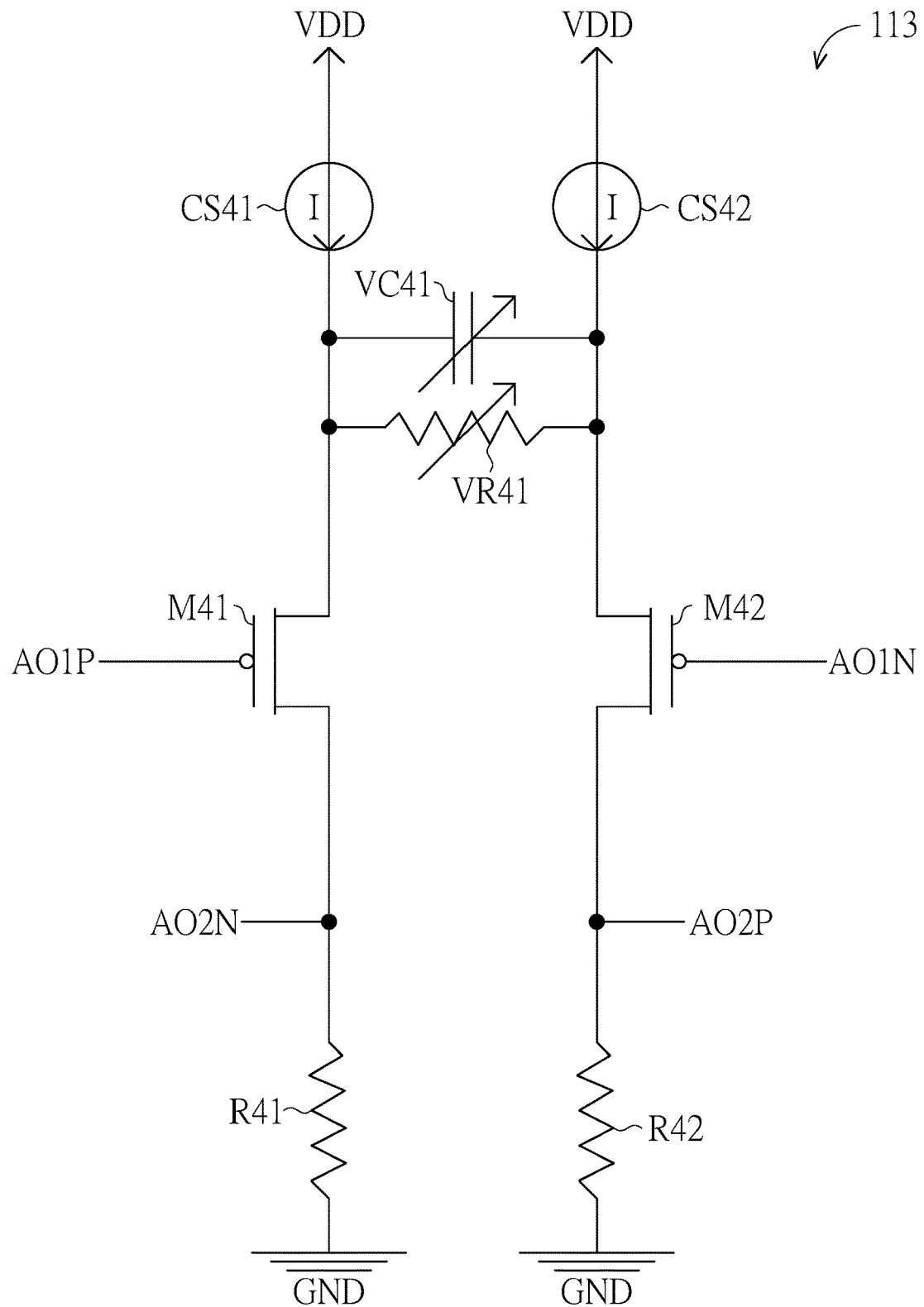
FIG. 4 is a circuit diagram of an input stage of an equalization (EQ) filter according to an embodiment.

For example, FIG. 4 is a circuit diagram of the input stage of the EQ filter 113 according to an embodiment. In the embodiment shown in FIG. 4, the input stage of the EQ filter 113 includes a current source CS41, a current source CS42, a variable capacitor VC41, a variable resistor VR41, an input transistor M41, an input transistor M42, a resistor R41, and a resistor R42. The control ends (e.g., gates) of the input transistors M41 and M42 (input differential pair) are respectively coupled to the first input end and the second input end of the input stage of the EQ filter 113 shown in FIG. 4 to receive the first-end signal AO1P and the second-end signal AO1N (input differential signal). In the embodiment shown in FIG. 4, the input transistors M41 and M42 are P-type metal oxide semiconductor (PMOS) transistors.

The first end and the second end of the current source CS41 are respectively coupled to a power supply voltage VDD and the first end (e.g., the source) of the input transistor M41. The first end of the input transistor M41 is further coupled to the first end of the variable capacitor VC41 and the first end of the variable resistor VR41. The first end and the second end of the current source CS42 are respectively coupled to the power supply voltage VDD and the first end (e.g., the source) of the input transistor M42. The first end of the input transistor M42 is further coupled to the second end of the variable capacitor VC41 and the second end of the variable resistor VR41. The first end and the second end of the resistor R41 are respectively coupled to the second end (e.g., the drain) of the input transistor M41 and the reference voltage (e.g., a ground voltage GND or other fixed voltages). The first end and the second end of the resistor R42 are respectively coupled to the second end (e.g., the drain) of the input transistor M42 and the reference voltage (e.g., the ground voltage GND or other fixed voltages). The second ends of the input transistors M41 and M42 respectively output a first-end signal AO2P and a second-end signal AO2N (the equalized differential signal) to other stages of the EQ filter 113 or the CML buffer string 114.

Figure 5:
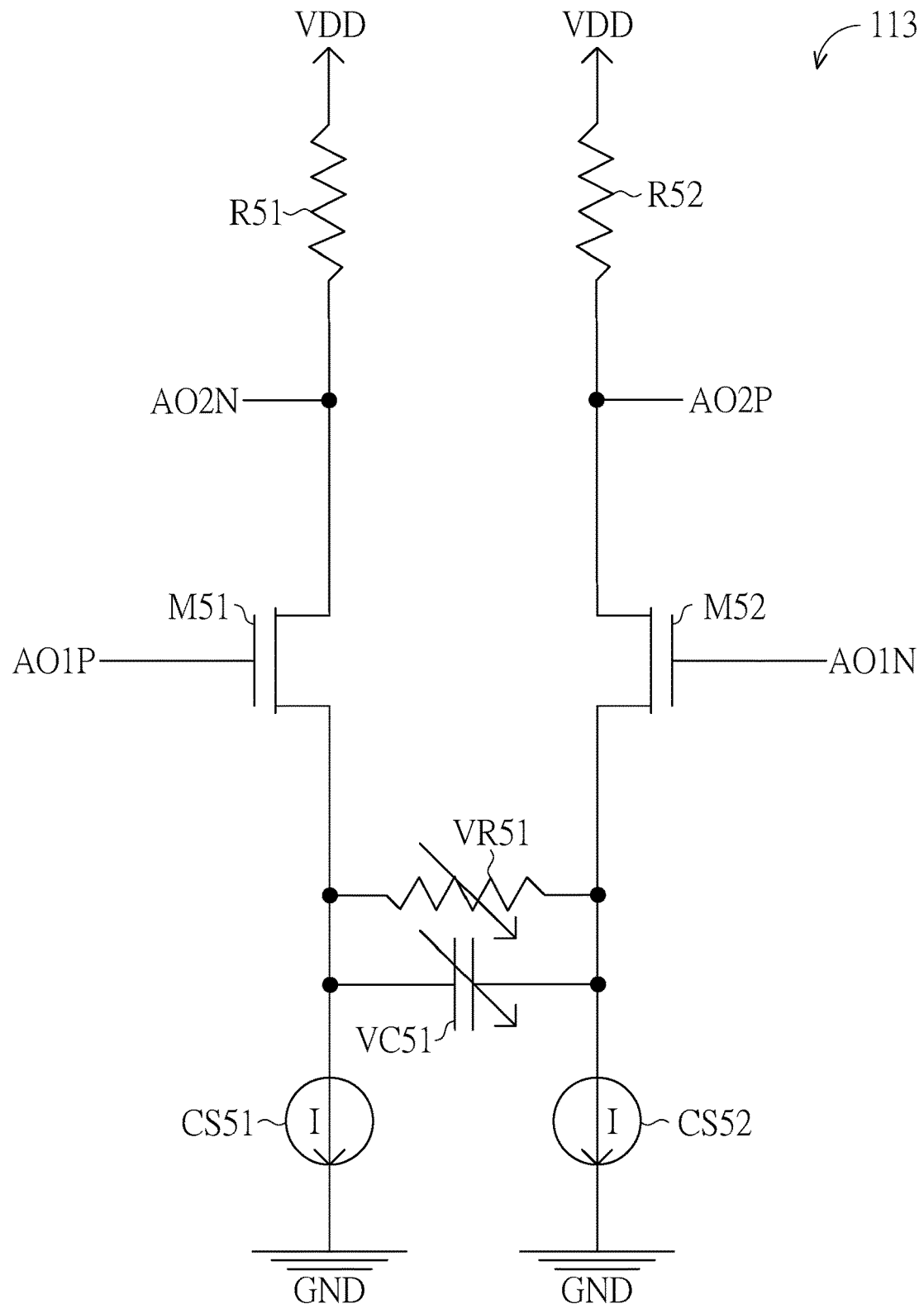
FIG. 5 is a circuit diagram of an input stage of an EQ filter according to another embodiment.

FIG. 5 is a circuit diagram of the input stage of the EQ filter 113 according to another embodiment. In the embodiment shown in FIG. 5, the input stage of the EQ filter 113 includes a current source CS51, a current source CS52, a variable capacitor VC51, a variable resistor VR51, an input transistor M51, an input transistor M52, a resistor R51, and a resistor R52. The control ends (e.g., gates) of the input transistors M51 and M52 (input differential pair) respectively receive the first-end signal AO1P and the second-end signal AO1N (the input differential signal Sin). In the embodiment shown in FIG. 5, the input transistors M51 and M52 are N-type metal oxide semiconductor (NMOS) transistors.

The first ends of the current sources CS51 and CS52 are coupled to a reference voltage (e.g., a ground voltage or other fixed voltages). The second end of the current source CS51 is coupled to the first end (e.g., the source) of the input transistor M51. The first end of the input transistor M51 is further coupled to the first end of the variable capacitor VC51 and the first end of the variable resistor VR51. The second end of the current source CS52 is coupled to the first end (e.g., the source) of the input transistor M52. The first end of the input transistor M52 is further coupled to the second end of the variable capacitor VC51 and the second end of the variable resistor VR51. The first end of the resistor R51 is coupled to the second end (e.g., the drain) of the input transistor M51. The first end of the resistor R52 is coupled to the second end (e.g., the drain) of the input transistor M52. The second ends of the resistors R51 and R52 are coupled to the power supply voltage VDD. The second ends of the input transistors M51 and M52 respectively output the first-end signal AO2P and the second-end signal AO2N (the equalized differential signal) to other stages of the EQ filter 113 or the CML buffer string 114.

In the embodiment shown in FIG. 3, the input end pair of the CML buffer string 114 is coupled to the output end pair of the EQ filter 113 to receive the first-end signal AO2P and the second-end signal AO2N (the equalized differential signal). The CML buffer string 114 may include n CML buffers 114_1, . . . , 114_n. The number n of the CML buffers 114_1 to 114_n may be determined according to the actual design. The CML buffers 114_1 to 114_n are connected in series with each other. According to actual design, in some embodiments, a first-end signal AOXP and a second-end signal AOXN of the equalized differential signal Seq may be the differential signals output by the output end of any one of the CML buffers 114_1 to 114_n of the CML buffer string 114. In other embodiments, the first-end signal AOXP and the second-end signal AOXN of the equalized differential signal Seq may be a first-end signal AO2P and a second-end signal AO2N of the differential signal output by the output end of the EQ filter 113. In other embodiments, the first-end signal AOXP and the second-end signal AOXN of the equalized differential signal Seq may be a first-end signal AO3P and a second-end signal AO3N of the differential signal output by the CML buffer string 114. In other embodiments, the first-end signal AOXP and the second-end signal AOXN of the equalized differential signal Seq may be the internal differential signals of the DTS buffer 115.

The input end pair of the DTS buffer 115 is coupled to the output end pair of the CML buffer string 114 to receive the first-end signal AO3P and the second-end signal AO3N (the equalized differential signal). The DTS buffer 115 may convert the equalized differential signals (the first-end signal AO3P and the second-end signal AO3N) into a single-end signal Sout. The DTS buffer 115 may output the single-end signal Sout to a next-stage circuit (not shown), such as a clock and data recovery (CDR) circuit and/or other circuits.

During normal operation, the channel between the receiving channel circuit 110 and the AOC circuit 120 configured to transmit the first-end signal AOXP and the second-end signal AOXN (the equalized differential signal Seq) is turned off. During the compensation correction period, the transmission channel of the first-end signal AOXP and the second-end signal AOXN (the equalized differential signal Seq) is turned on.

In the embodiment shown in FIG. 3, the AOC circuit 120 includes a peak detection circuit 121, a peak detection circuit 122, and a compare circuit 123. The peak detection circuit 121 is coupled to the receiving channel circuit 110 to receive the equalized first-end signal AOXP. The peak detection circuit 121 may detect the peak of the equalized first-end signal AOXP to generate a voltage VP (peak detection result). The peak detection circuit 122 is coupled to the receiving channel circuit 110 to receive the equalized second-end signal AOXN. The peak detection circuit 122 may detect the peak of the equalized second-end signal AOXN to generate a voltage VN (peak detection result). For example, in the case that the input differential pair in the receiving channel circuit 110 is a PMOS transistor, the peaks detected by the peak detection circuit 121 and the peak detection circuit 122 may be the crest peaks of the equalized first-end signal AOXP and the equalized second-end signal AOXN. In the case that the input differential pair in the receiving channel circuit 110 is an NMOS transistor, the peaks detected by the peak detection circuit 121 and the peak detection circuit 122 may be the trough peaks of the equalized first-end signal AOXP and the equalized second-end signal AOXN.

The compare circuit 123 is coupled to the peak detection circuit 121 and the peak detection circuit 122 to receive the voltages VP and VN (peak detection results). The compare circuit 123 may compare the voltages VP and VN to generate a comparison result. The compare circuit 123 may compensate the mismatch of the input differential pair in the receiving channel circuit 110 according to the comparison result. For example (but not limited thereto), the compare circuit 123 may choose to compensate (increase) the bias current of the first input transistor or the second input transistor in the input differential pair according to the comparison result to compensate the mismatch of the input differential pair.

In the embodiment shown in FIG. 3, the peak detection circuit 121 includes a peak detector (PD) 121a and a low-pass filter (LPF) 121b, and the peak detection circuit 122 includes a peak detector 122a and a low-pass filter 122b. The input end of the peak detector 121a is coupled to the receiving channel circuit 110 to receive the equalized first-end signal AOXP. The peak detector 121a may detect the peak of the equalized first-end signal AOXP, and then transmit a peak VpP to the low-pass filter 121b. The input end of the low-pass filter 121b is coupled to the output end of the peak detector 121a. The low-pass filter 121b may generate the voltage VP (peak detection result) to the compare circuit 123. The peak detection circuit 122, the peak detector 122a, and the low-pass filter 122b are as provided in the related descriptions of the peak detection circuit 121, the peak detector 121a, and the low-pass filter 121b and may be deduced by analogy and are therefore not repeated herein.

Figure 6:
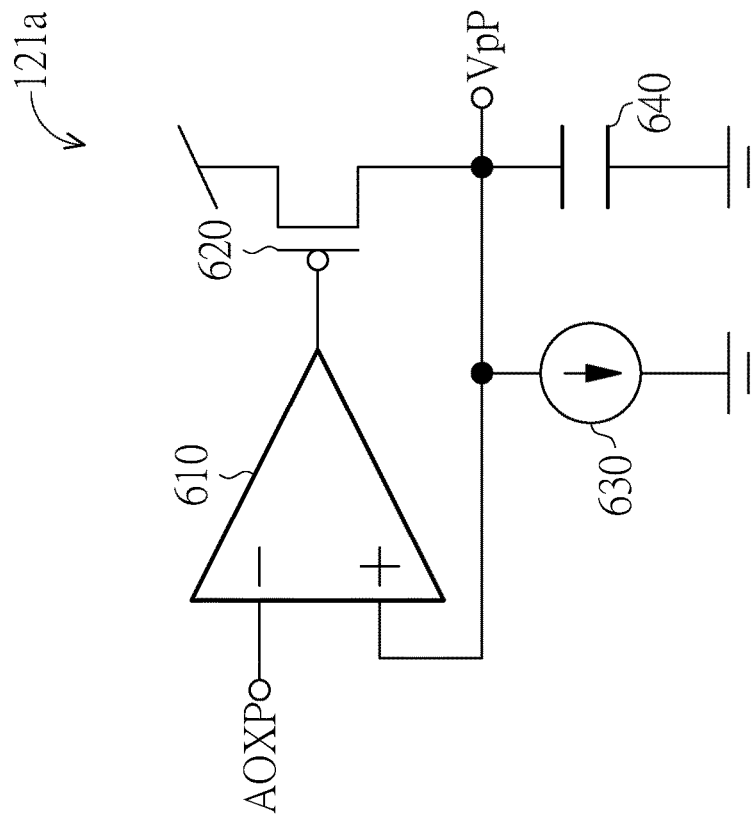
FIG. 6 is a circuit diagram of a peak detector according to an embodiment.

FIG. 6 is a circuit diagram of the peak detector 121a according to an embodiment. The peak detector 122a shown in FIG. 3 is as provided in the related description of the peak detector 121a shown in FIG. 6 and may be deduced by analogy. In the embodiment shown in FIG. 6, the peak detector 121a includes an amplifier 610, a transistor 620, a current source 630, and a capacitor 640. The inverting input end of the amplifier 610 is coupled to the receiving channel circuit 110 to receive the equalized first-end signal AOXP. The gate of the transistor 620 is coupled to the output end of the amplifier 610. The drain of the transistor 620 is coupled to the non-inverting input end of amplifier 610. The current source 630 and the capacitor 640 are coupled to the drain of the transistor 620.

Figure 7:
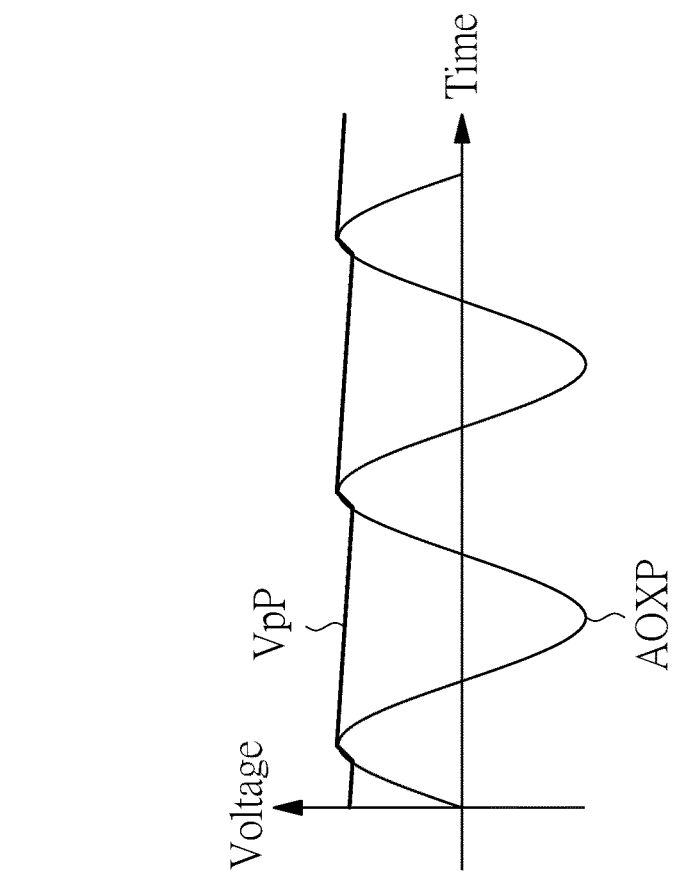
FIG. 7 is a circuit diagram of an equalized first-end signal AOXP and a peak VpP shown in FIG. 6 according to an embodiment of the disclosure.

FIG. 7 is a circuit diagram of the equalized first-end signal AOXP and the peak VpP shown in FIG. 6 according to an embodiment of the disclosure. In FIG. 6, the horizontal axis represents time, and the vertical axis represents voltage. In the example shown in FIG. 7, the equalized first-end signal AOXP is set as a sine wave. The inverting input end of the amplifier 610 may receive the equalized first-end signal AOXP, and the drain of the transistor 620 may output the peak VpP of the equalized first-end signal AOXP to the low-pass filter 121b.

In the embodiment shown in FIG. 3, the compare circuit 123 includes a comparator 123a, an up/down counter 123b, and a code-to-current controller 123c. The first input end and the second input end of the comparator 123a are respectively coupled to the peak detection circuits 121 and 122 to receive the voltages VP and VN (peak detection results). The comparator 123a may compare the voltages VP and VN to generate a comparison result for the up/down counter 123b. The input end of the up/down counter 123b is coupled to the output end of the comparator 123a to receive the comparison result. The up/down counter 123b may increase and decrease a count value CNT according to the comparison result of the comparator 123a. The input end of the code-to-current controller 123c is coupled to the output end of the up/down counter 123b to receive the count value CNT. The code-to-current controller 123c may control the bias current of the input differential pair of the receiving channel circuit 110 according to the count value CNT, so as to compensate the mismatch of the input differential pair.

Figure 8:
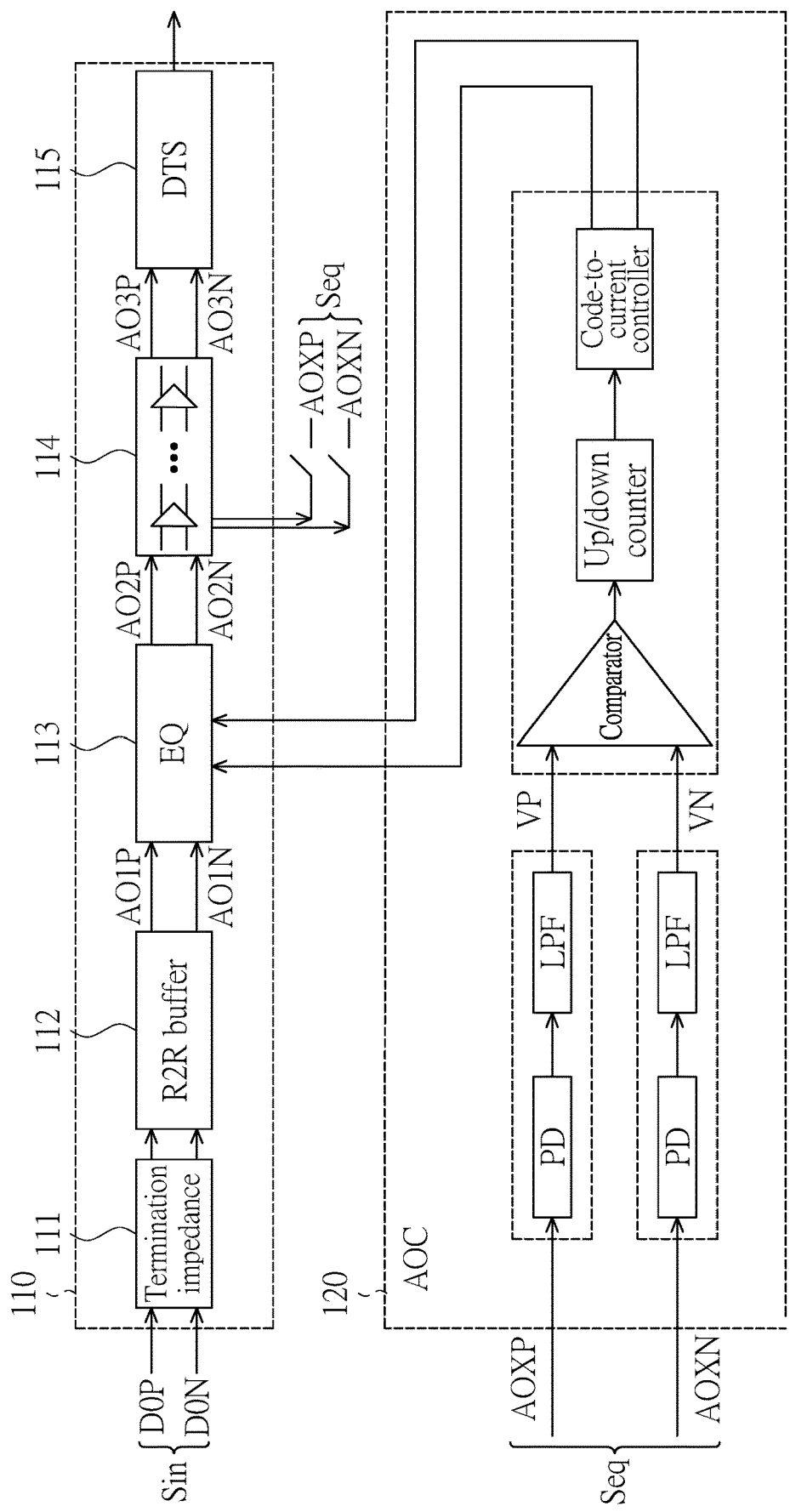
FIG. 8 is a circuit block diagram of a receiving channel circuit according to another embodiment of the disclosure.

FIG. 8 is a circuit block diagram of the receiving channel circuit 110 according to another embodiment of the disclosure. The receiving channel circuit 110 and the AOC circuit 120 shown in FIG. 8 are as provided in the related descriptions of the receiving channel circuit 110 and the AOC circuit 120 shown in FIG. 3 and are therefore not repeated herein. In the embodiment shown in FIG. 8, the receiving channel circuit 110 includes the termination impedance matching circuit 111, a rail-to-rail (R2R) buffer 112, the EQ filter 113, the CML buffer string 114, and the DTS buffer 115. The input end pair of the R2R buffer 112 is coupled to the termination impedance matching circuit 111. The output end pair of the R2R buffer 112 is coupled to the input end pair of the EQ filter 113 to provide the first-end signal AO1P and the second-end signal AO1N. The termination impedance matching circuit 111, the EQ filter 113, the CML buffer string 114, and the DTS buffer 115 shown in FIG. 8 are as provided in the related descriptions of the termination impedance matching circuit 111, the EQ filter 113, the CML buffer string 114, and the DTS buffer 115 shown in FIG. 3 and are therefore not repeated herein.

Figure 9:
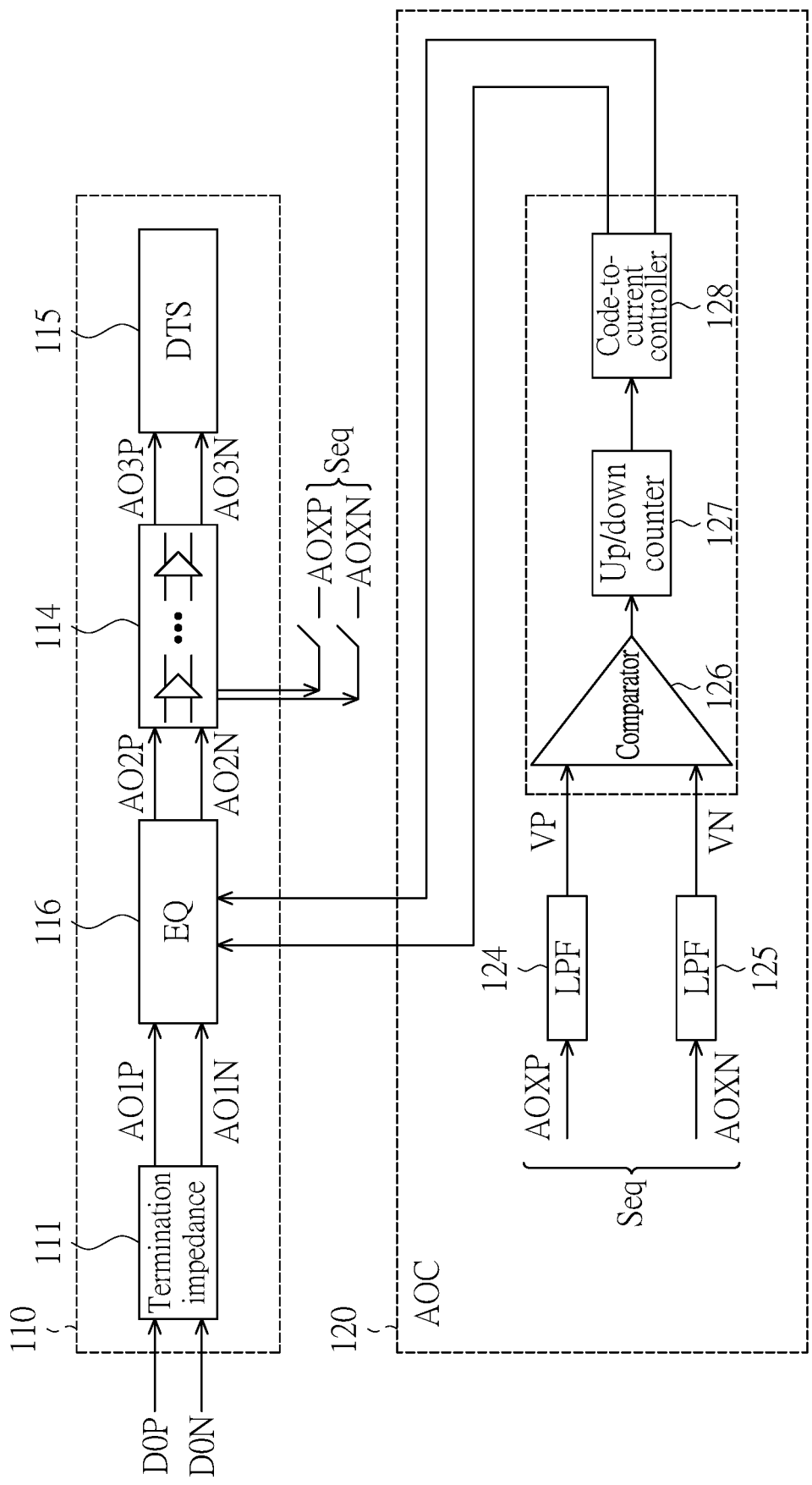
FIG. 9 is a circuit block diagram of a receiving channel circuit and an AOC circuit according to another embodiment of the disclosure.

FIG. 9 is a circuit block diagram of the receiving channel circuit 110 and the AOC circuit 120 according to another embodiment of the disclosure. The receiving channel circuit 110 and the AOC circuit 120 shown in FIG. 9 are as provided in the related descriptions of the receiving channel circuit 110 and the AOC circuit 120 shown in FIG. 3 and are therefore not repeated herein. In the embodiment shown in FIG. 9, the receiving channel circuit 110 includes the termination impedance matching circuit 111, an EQ filter 116, the CML buffer string 114, and the DTS buffer 115. The termination impedance matching circuit 111, the EQ filter 116, the CML buffer string 114, and the DTS buffer 115 shown in FIG. 9 are as provided in the related descriptions of the termination impedance matching circuit 111, the EQ filter 113, the CML buffer string 114, and the DTS buffer 115 shown in FIG. 3 and are therefore not repeated herein.

In the embodiment shown in FIG. 9, the AOC circuit 120 includes a low-pass filter 124, a low-pass filter 125, a comparator 126, an up/down counter 127, and a code-to-current controller 128. The input end of the low-pass filter 124 is coupled to the receiving channel circuit 110 to receive the equalized first-end signal AOXP. The low-pass filter 124 may filter out the high-frequency components of the equalized first-end signal AOXP to generate the voltage VP. The low-pass filter 125 is coupled to the receiving channel circuit 110 to receive the equalized second-end signal AOXN. The low-pass filter 125 may filter out the high-frequency components of the equalized second-end signal AOXN to generate the voltage VN. The comparator 126 may compare the voltages VP and VN to generate a comparison result for the up/down counter 127. The low-pass filter 124, the low-pass filter 125, the comparator 126, the up/down counter 127, and the code-to-current controller 128 shown in FIG. 9 are as provided in the related descriptions of the low-pass filter 121b, the low-pass filter 122b, the comparator 123a, the up/down counter 123b, and the code-to-current controller 123c shown in FIG. 3 and are therefore not repeated herein.

Figure 10:
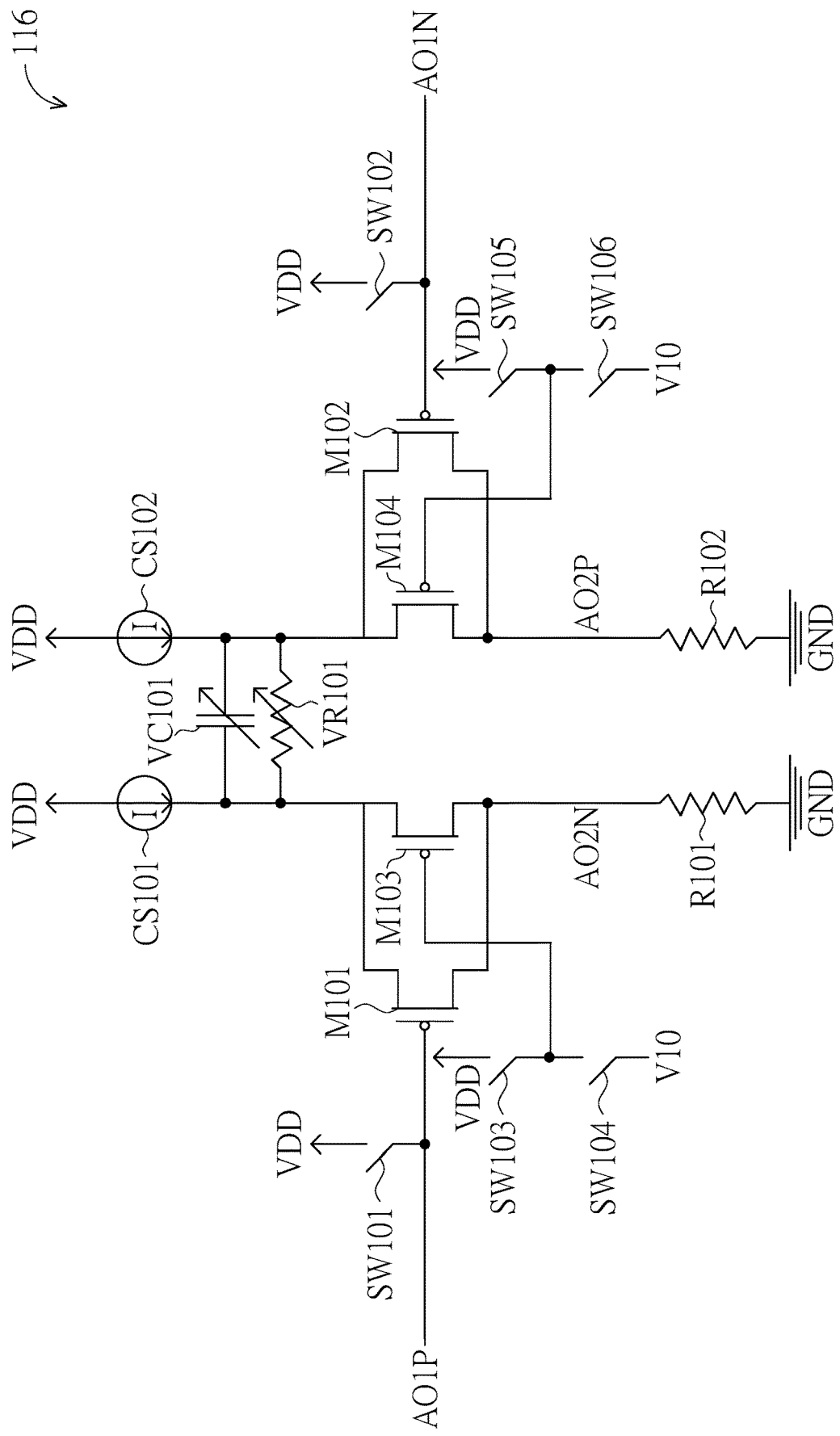
FIG. 10 is a circuit diagram of the input stage of the EQ filter shown in FIG. 9 according to another embodiment of the disclosure.

FIG. 10 is a circuit diagram of the input stage of the EQ filter 116 shown in FIG. 9 according to another embodiment of the disclosure. In the embodiment shown in FIG. 10, the input stage of the EQ filter 116 includes a current source CS101, a current source CS102, a variable capacitor VC101, a variable resistor VR101, an input transistor M101, an input transistor M102, a resistor R101, and a resistor R102. The current source CS101, the current source CS102, the variable capacitor VC101, the variable resistor VR101, the input transistor M101, the input transistor M102, the resistor R101, and the resistor R102 shown in FIG. 10 are as provided in the related descriptions of the current source CS41, the current source CS42, the variable capacitor VC41, the variable resistor VR41, the input transistor M41, the input transistor M42, the resistor R41, and the resistor R42 shown in FIG. 4 and are therefore not repeated herein.

In the embodiment shown in FIG. 10, the input stage of the EQ filter 116 further includes a redundant transistor M103, a redundant transistor M104, a switch SW101, a switch SW102, a switch SW103, a switch SW104, a switch SW105, and a switch SW106. The first end and the second end of the redundant transistor M103 are respectively coupled to the first end and the second end of the input transistor M101. The first end and the second end of the redundant transistor M104 are respectively coupled to the first end and the second end of the input transistor M102.

The first end and the second end of the switch SW101 are respectively coupled to the control end of the input transistor M101 and the power supply voltage VDD. The first end and the second end of the switch SW102 are respectively coupled to the control end of the input transistor M102 and the power supply voltage VDD. The first end and the second end of the switch SW103 are respectively coupled to the control end of the redundant transistor M103 and the power supply voltage VDD. The first end of the switch SW104 is coupled to the control end of the redundant transistor M103. The first end and the second end of the switch SW105 are respectively coupled to the control end of the redundant transistor M104 and the power supply voltage VDD. The first end of the switch SW106 is coupled to the control end of the redundant transistor M104. The second end of the switch SW104 and the second end of the switch SW106 are respectively coupled to a voltage V10. According to the actual design, the voltage V10 may be a ground voltage or a common mode voltage.

When the receiver 100 is operated in the correction period, the switches SW103 and SW105 are turned off, and the switches SW101, SW102, SW104, and SW106 are turned on. Therefore, the input transistors M101 and M102 are turned off, and the redundant transistors M103 and M104 are turned on based on the voltage V10. The position of the redundant transistor M103 is as close as possible to the input transistor M101, and therefore the characteristics (such as the threshold voltage Vth, etc.) of the redundant transistor M103 are almost the same as those of the input transistor M101. The position of the redundant transistor M104 is as close as possible to the input transistor M102, and therefore the characteristics of the redundant transistor M104 are almost the same as those of the input transistor M102.

In the correction period, the redundant transistors M103 and M104 are turned on based on the voltage V10. When the threshold voltage Vth of the redundant transistor M103 is greater than the threshold voltage Vth of the redundant transistor M104, the level of the first-end signal AO2P is greater than the level of the second-end signal AO2N, so that the level of the first-end signal AOXP is greater than the level of the second-end signal AOXN. Therefore, the AOC circuit 120 may increase the bias current of the input transistor M101 to compensate the mismatch of the input transistors M101 and M102. On the contrary, when the threshold voltage Vth of the redundant transistor M103 is less than the threshold voltage Vth of the redundant transistor M104, the level of the first-end signal AO2P is less than the level of the second-end signal AO2N, so that the level of the first-end signal AOXP is less than the level of the second-end signal AOXN. Therefore, the AOC circuit 120 may increase the bias current of the input transistor M102 to compensate the mismatch of the input transistors M101 and M102. When the correction period is ended, the switches SW103 and SW105 are turned on, and the switches SW101, SW102, SW104, and SW106 are turned off.

Figure 11:
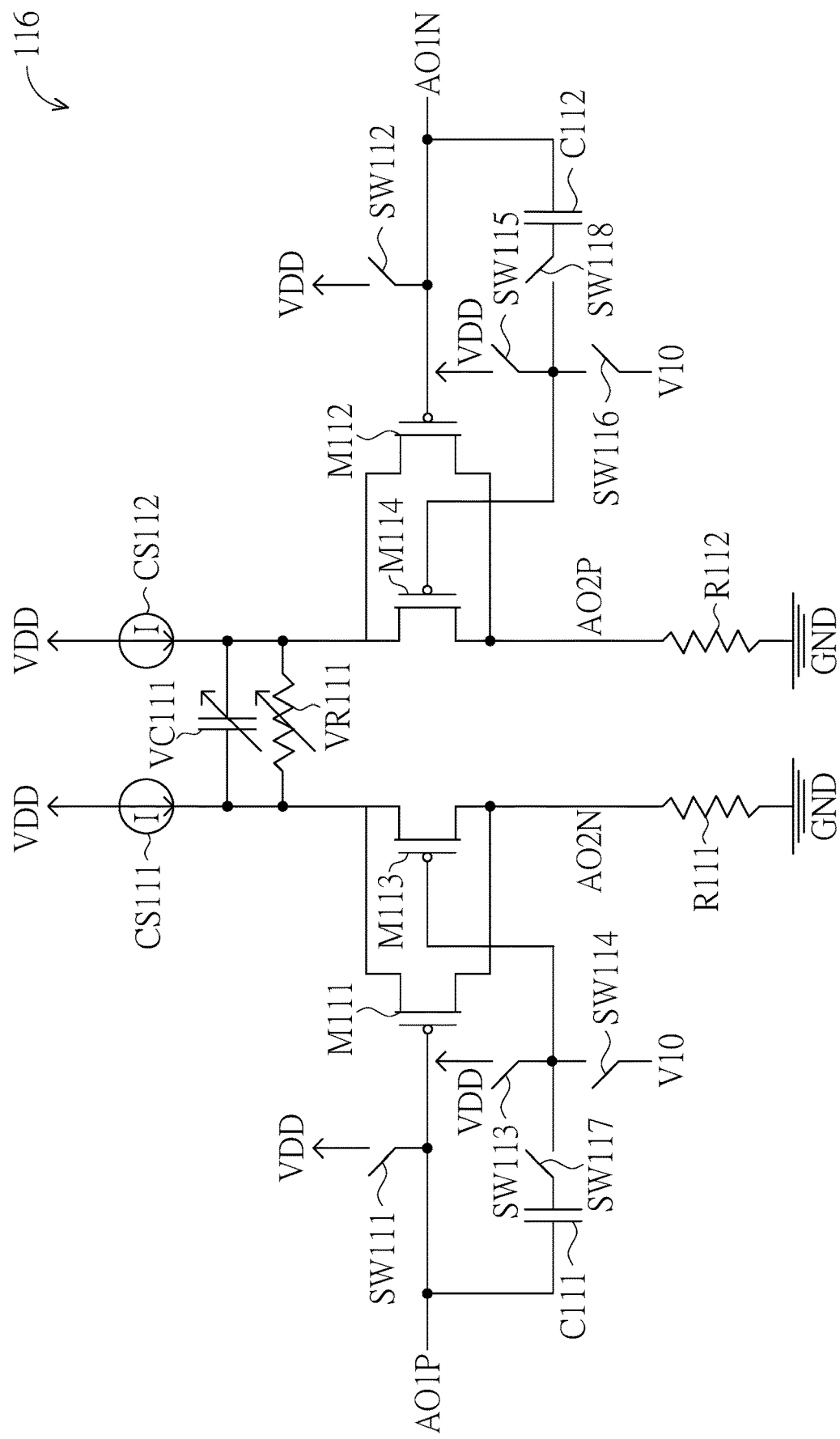
FIG. 11 is a circuit diagram of the input stage of the EQ filter shown in FIG. 9 according to another embodiment of the disclosure.

FIG. 11 is a circuit diagram of the input stage of the EQ filter 116 shown in FIG. 9 according to another embodiment of the disclosure. In the embodiment shown in FIG. 11, the input stage of the EQ filter 116 includes a current source CS111, a current source CS112, a variable capacitor VC111, a variable resistor VR111, an input transistor M111, an input transistor M112, a resistor R111, and a resistor R112. The current source CS111, the current source CS112, the variable capacitor VC111, the variable resistor VR111, the input transistor M111, the input transistor M112, the resistor R111, and the resistor R112 shown in FIG. 11 are as provided in the related descriptions of the current source CS41, the current source CS42, the variable capacitor VC41, the variable resistor VR41, the input transistor M41, the input transistor M42, the resistor R41, and the resistor R42 shown in FIG. 4 and are therefore not repeated herein.

In the embodiment shown in FIG. 11, the input stage of the EQ filter 116 further includes a redundant transistor M113, a redundant transistor M114, a switch SW111, a switch SW112, a switch SW113, a switch SW114, a switch SW115, a switch SW116, a switch SW117, a switch SW118, a capacitor C111, and a capacitor C112. The redundant transistor M113, the redundant transistor M114, the switch SW111, the switch SW112, the switch SW113, the switch SW114, the switch SW115, and the switch SW116 shown in FIG. 11 are as provided in the related descriptions of the redundant transistor M103, the redundant transistor M104, the switch SW101, the switch SW102, the switch SW103, the switch SW104, the switch SW105, and the switch SW106 shown in FIG. 10 and are therefore not repeated herein.

In the embodiment shown in FIG. 11, the first end of the capacitor C111 is coupled to the first input end of the input stage of the EQ filter 116 to receive the first-end signal AO1P of the input differential signal. The first end of the capacitor C112 is coupled to the second input end of the input stage of the EQ filter 116 to receive the second-end signal AO1N of the input differential signal. The first end and the second end of the switch SW117 are respectively coupled to the second end of the capacitor C111 and the control end of the redundant transistor M103. The first end and the second end of the switch SW118 are respectively coupled to the second end of the capacitor C112 and the control end of the redundant transistor M104. When the receiver 100 is operated in the correction period, the switches SW117 and SW118 are turned on. When the correction period is ended, the switches SW117 and SW118 are turned off.

Figure 12:
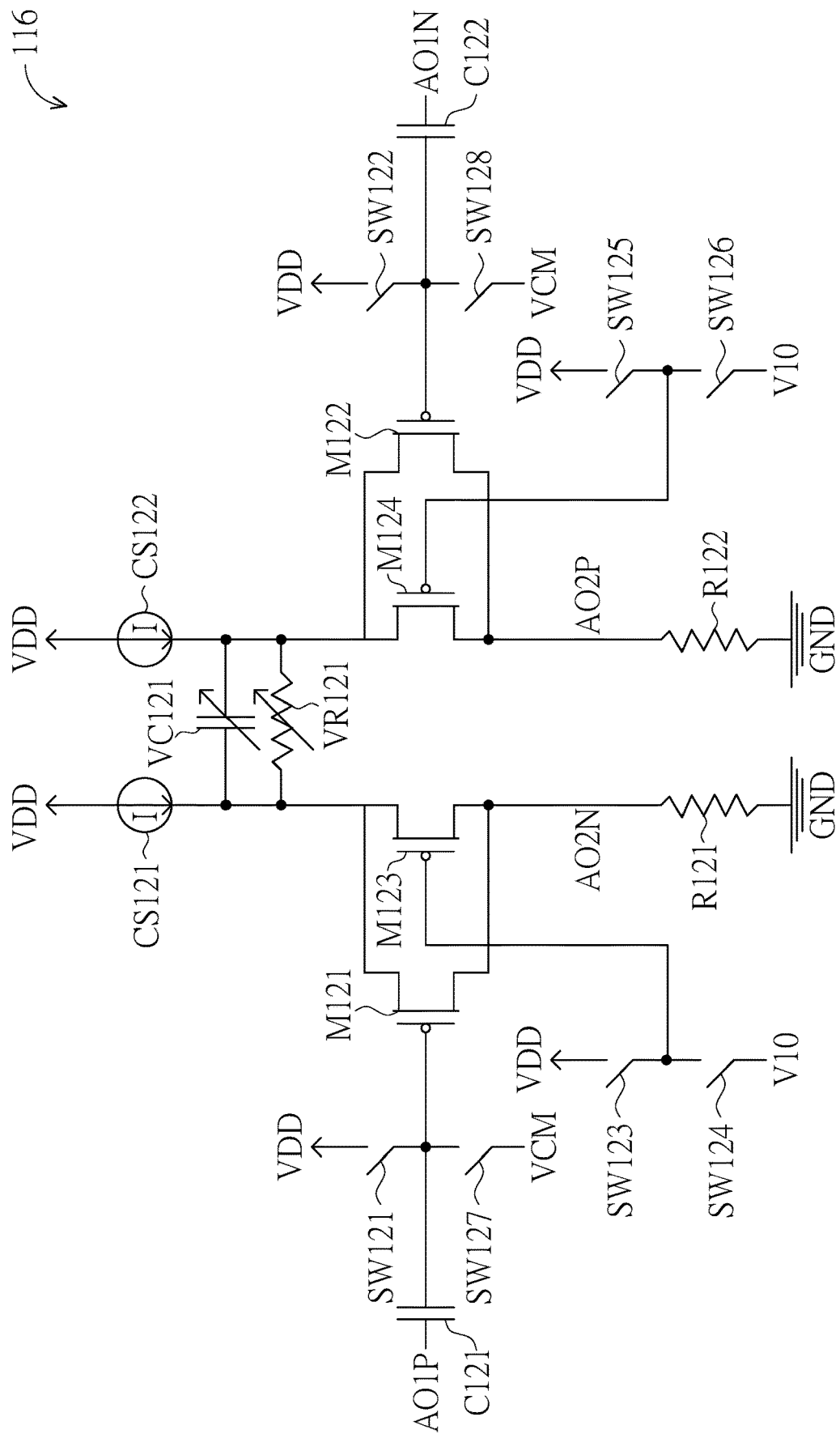
FIG. 12 is a circuit diagram of the input stage of the EQ filter shown in FIG. 9 according to another embodiment of the disclosure.

FIG. 12 is a circuit diagram of the input stage of the EQ filter 116 shown in FIG. 9 according to another embodiment of the disclosure. In the embodiment shown in FIG. 12, the input stage of the EQ filter 116 includes a current source CS121, a current source CS122, a variable capacitor VC121, a variable resistor VR121, an input transistor M121, an input transistor M122, a resistor R121, and a resistor R122. The current source CS121, the current source CS122, the variable capacitor VC121, the variable resistor VR121, the input transistor M121, the input transistor M122, the resistor R121, and the resistor R122 shown in FIG. 12 are as provided in the related descriptions of the current source CS41, the current source CS42, the variable capacitor VC41, the variable resistor VR41, the input transistor M41, the input transistor M42, the resistor R41, and the resistor R42 shown in FIG. 4 and are therefore not repeated herein.

In the embodiment shown in FIG. 12, the input stage of the EQ filter 116 further includes a redundant transistor M123, a redundant transistor M124, a switch SW121, a switch SW122, a switch SW123, a switch SW124, a switch SW125, a switch SW126, a switch SW127, a switch SW128, a capacitor C121, and a capacitor C122. The redundant transistor M123, the redundant transistor M124, the switch SW121, the switch SW122, the switch SW123, the switch SW124, the switch SW125, and the switch SW126 shown in FIG. 12 are as provided in the related descriptions of the redundant transistor M103, the redundant transistor M104, the switch SW101, the switch SW102, the switch SW103, the switch SW104, the switch SW105, and the switch SW106 shown in FIG. 10 and are therefore not repeated herein.

In the embodiment shown in FIG. 12, the first end of the capacitor C121 is coupled to the first input end of the input stage of the EQ filter 116 to receive the first-end signal AO1P of the input differential signal. The second end of the capacitor C121 is coupled to the control end of the input transistor M121. The first end of the capacitor C122 is coupled to the second input end of the input stage of the EQ filter 116 to receive the second-end signal AO1N of the input differential signal. The second end of the capacitor C122 is coupled to the control end of the input transistor M122. The first end of the switch SW127 is coupled to the control end of the input transistor M121. The second end of the switch SW127 is coupled to a common mode voltage VCM. The first end of the switch SW128 is coupled to the control end of the input transistor M122. The second end of the switch SW128 is coupled to the common mode voltage VCM. When the receiver 100 is operated in the correction period, the switches SW127 and SW128 are turned off. When the correction period is ended, the switches SW127 and SW128 are turned on.

Figure 13:
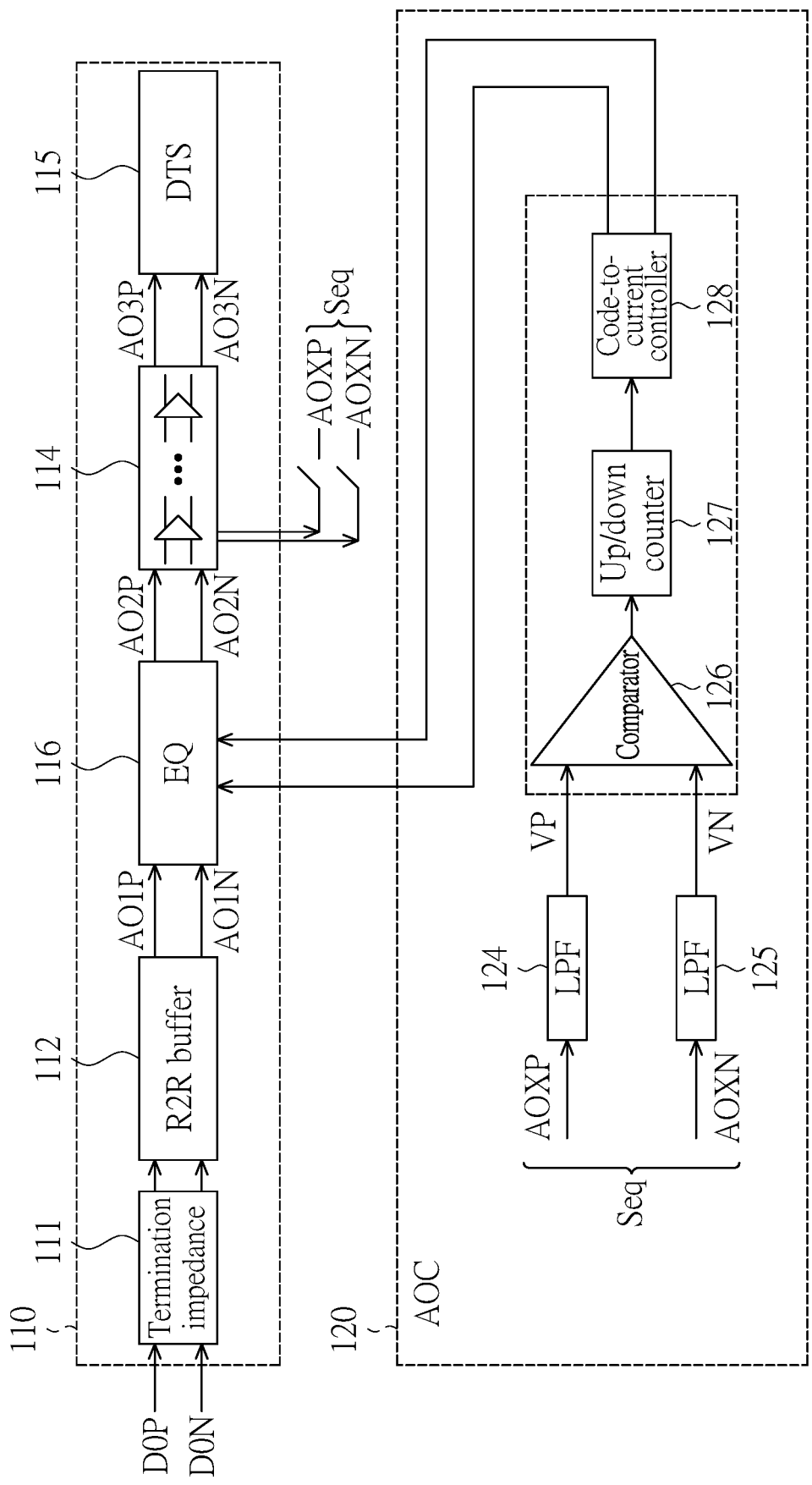
FIG. 13 is a circuit block diagram of a receiving channel circuit according to another embodiment of the disclosure.

FIG. 13 is a circuit block diagram of the receiving channel circuit 110 according to another embodiment of the disclosure. The receiving channel circuit 110 and the AOC circuit 120 shown in FIG. 13 are as provided in the related descriptions of the receiving channel circuit 110 and the AOC circuit 120 shown in FIG. 9 and are therefore not repeated herein. In the embodiment shown in FIG. 13, the receiving channel circuit 110 includes the termination impedance matching circuit 111, the R2R buffer 112, the EQ filter 116, the CML buffer string 114, and the DTS buffer 115. The input end pair of the R2R buffer 112 is coupled to the termination impedance matching circuit 111. The output end pair of the R2R buffer 112 is coupled to the input end pair of the EQ filter 116 to provide the first-end signal AO1P and the second-end signal AO1N. The termination impedance matching circuit 111, the EQ filter 116, the CML buffer string 114, and the DTS buffer 115 shown in FIG. 13 are as provided in the related descriptions of the termination impedance matching circuit 111, the EQ filter 116, the CML buffer string 114, and the DTS buffer 115 shown in FIG. 9 and are therefore not repeated herein.

Figure 14:
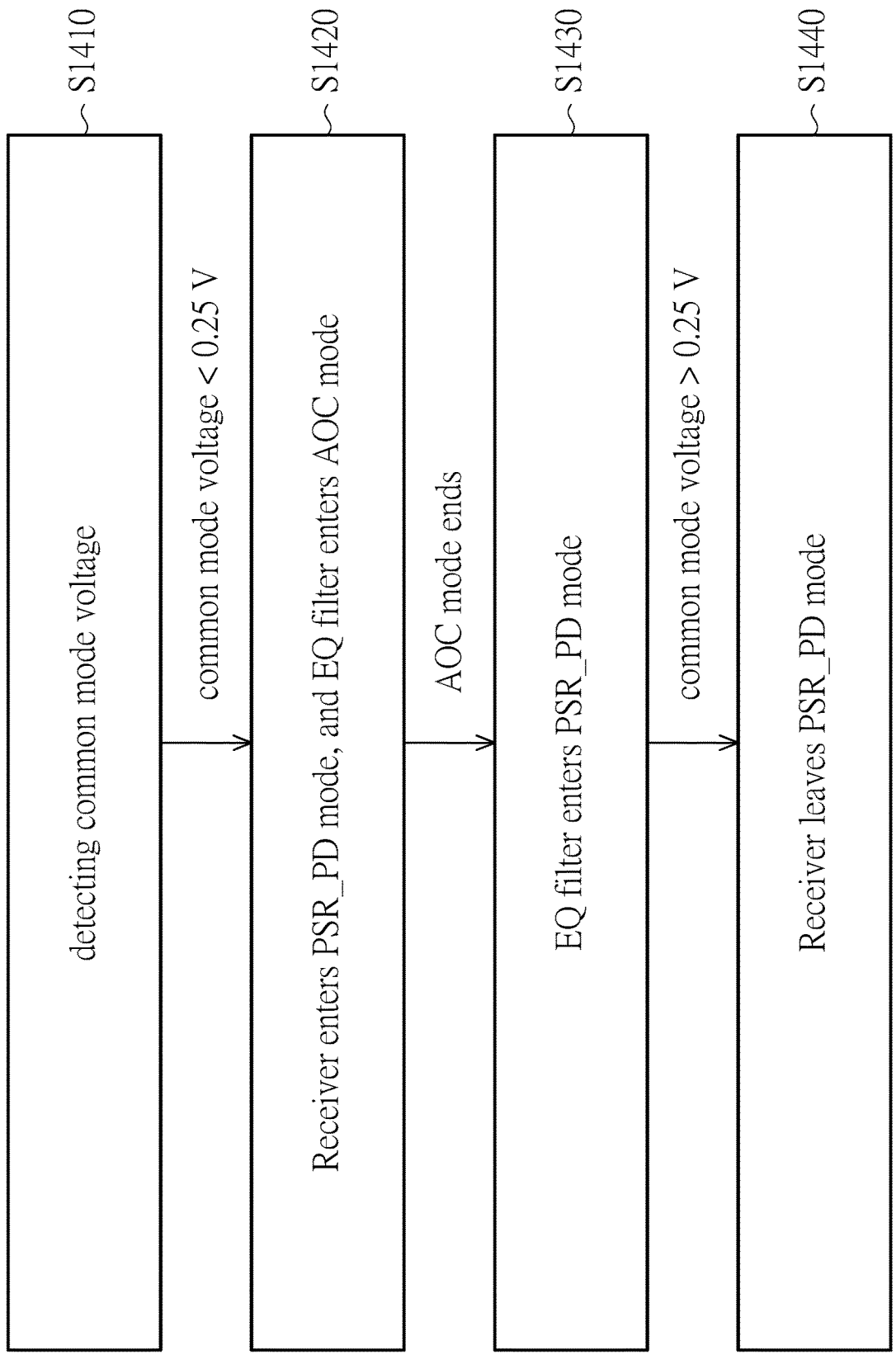
FIG. 14 is a flowchart of an operation method of the receiver according to an embodiment of the disclosure.

FIG. 14 is a flowchart of an operation method of the receiver 100 according to an embodiment of the disclosure. Please refer to FIG. 1, FIG. 9 and FIG. 14. The transmitter 10 maintains the input differential signal Sin as a common mode voltage. The receiver 100 may detect the common mode voltage of the input differential signal Sin (step S1410). When the common mode voltage is less than a threshold (eg, 0.25 V), the receiver 100 enters a PSR_PD mode, and the EQ filter 116 enters the AOC (automatic offset cancellation) mode, ie, step S1420. The activation of the PSR_PD mode will pull the first-end signal DOP and the second-end signal DON of the input differential signal Sin to the ground voltage GND. At this time, the EQ filter 116 may perform auto offset cancelation. If there is no mismatch between the input differential pairs in the receiving channel circuit 110, the level of the first-end signal AOXP is approximately equal to the level of the second-end signal AOXN. If the input differential pair is mismatched, the AOC circuit 120 can correct the mismatch of the input differential pair by comparing the first-end signal AOXP and the second-end signal AOXN. The related operations of the AOC mode can be referred to the related descriptions in FIG. 9 to FIG. 13, and thus will not be repeated here. When the AOC mode ends, the EQ filter 116 enters the PSR_PD mode, ie, step S1430. When the common mode voltage is greater than the threshold (eg, 0.25 V), the receiver 100 leaves the PSR_PD mode, ie, step S1440.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A receiver, comprising:
a receiving channel circuit configured to generate an equalized differential signal according to an input differential signal; and
an automatic offset cancellation (AOC) circuit coupled to the receiving channel circuit to receive the equalized differential signal, wherein the equalized differential signal comprises an equalized first-end signal and an equalized second-end signal, the AOC circuit detects a peak of the equalized first-end signal to generate a first peak detection result, the AOC circuit detects a peak of the equalized second-end signal to generate a second peak detection result, the AOC circuit compares the first peak detection result with the second peak detection result to generate a comparison result, and the AOC circuit compensates a mismatch of an input differential pair in the receiving channel circuit according to the comparison result.

2. The receiver of claim 1, wherein the input differential pair is an input transistor pair in an input stage of an equalization filter of the receiving channel circuit.

3. The receiver of claim 1, wherein the input differential pair comprises a first input transistor and a second input transistor, and the AOC circuit chooses to compensate a bias current of the first input transistor or the second input transistor according to the comparison result to compensate a mismatch of the input differential pair.

4. The receiver of claim 3, wherein the AOC circuit increases a bias current of the first input transistor when the comparison result indicates the first peak detection result is greater than the second peak detection result, and the AOC circuit increases a bias current of the second input transistor when the comparison result indicates the first peak detection result is less than the second peak detection result.

5. The receiver of claim 1, wherein the receiving channel circuit comprises:
an equalization (EQ) filter configured to receive the input differential signal, wherein the input differential pair is an input transistor pair in an input stage of the EQ filter;
a current-mode logic (CML) buffer string having an input end pair coupled to an output end pair of the EQ filter; and
a differential-to-single buffer having an input end pair coupled to an output end pair of the CML buffer string;
wherein the equalized differential signal is a differential signal output by the output end pair of the EQ filter or an output end pair of one CML buffer in the CML buffer string.

6. The receiver of claim 1, wherein the AOC circuit comprises:
a first peak detection circuit coupled to the receiving channel circuit to receive the equalized first-end signal so as to detect the peak of the equalized first-end signal to generate the first peak detection result;
a second peak detection circuit coupled to the receiving channel circuit to receive the equalized second-end signal so as to detect the peak of the equalized second-end signal to generate the second peak detection result; and
a compare circuit coupled to the first peak detection circuit and the second peak detection circuit to receive the first peak detection result and the second peak detection result so as to compare the first peak detection result and the second peak detection result to generate the comparison result, and compensate a mismatch of the input differential pair in the receiving channel circuit according to the comparison result.

7. The receiver of claim 6, wherein the first peak detection circuit comprises:
a peak detector having an input end coupled to the receiving channel circuit to receive the equalized first-end signal so as to detect the peak of the equalized first-end signal; and
a low-pass filter having an input end coupled to an output end of the peak detector, wherein the low-pass filter generates the first peak detection result to the compare circuit.

8. The receiver of claim 6, wherein the compare circuit comprises:
a comparator having a first input end and a second input end respectively coupled to the first peak detection circuit and the second peak detection circuit to receive the first peak detection result and the second peak detection result so as to compare the first peak detection result and the second peak detection result to generate the comparison result;
an up/down counter having an input end coupled to an output end of the comparator to receive the comparison result so as to increase or decrease a count value according to the comparison result; and
a code-to-current controller having an input end coupled to an output end of the up/down counter to receive the count value so as to control a bias current of the input differential pair according to the count value to compensate a mismatch of the input differential pair.

9. The receiver of claim 1, wherein the input differential pair is an input transistor pair in an input stage of an equalization filter of the receiving channel circuit, the input transistor pair comprises a first input transistor and a second input transistor, and the input stage further comprises:
a first redundant transistor having a first end and a second end respectively coupled to a first end and a second end of the first input transistor;
a second redundant transistor having a first end and a second end respectively coupled to a first end and a second end of the second input transistor;
a first switch having a first end and a second end respectively coupled to a control end of the first input transistor and a first voltage;
a second switch having a first end and a second end respectively coupled to a control end of the second input transistor and the first voltage;
a third switch having a first end and a second end respectively coupled to a control end of the first redundant transistor and the first voltage;
a fourth switch having a first end and a second end respectively coupled to the control end of the first redundant transistor and a second voltage;
a fifth switch having a first end and a second end respectively coupled to a control end of the second redundant transistor and the first voltage; and
a sixth switch having a first end and a second end respectively coupled to the control end of the second redundant transistor and the second voltage.

10. The receiver of claim 9, wherein the second voltage is a ground voltage or a common mode voltage.

11. The receiver of claim 9, wherein the third switch and the fifth switch are turned off and the first switch, the second switch, the fourth switch, and the sixth switch are turned on when the receiver is operated in a correction period, and the third switch and the fifth switch are turned on and the first switch, the second switch, the fourth switch, and the sixth switch are turned off when the correction period is ended.

12. The receiver of claim 9, wherein the input stage further comprises:
a first current source coupled to the first end of the first input transistor;
a second current source coupled to the first end of the second input transistor;
a variable capacitor having a first end and a second end respectively coupled to the first end of the first input transistor and the first end of the second input transistor;
a variable resistor having a first end and a second end respectively coupled to the first end of the first input transistor and the first end of the second input transistor;
a first resistor having a first end and a second end respectively coupled to the second end of the first input transistor and a third voltage; and
a second resistor having a first end and a second end respectively coupled to the second end of the second input transistor and the third voltage.

13. The receiver of claim 9, wherein the control end of the first input transistor is coupled to a first input end of the input stage, and the control end of the second input transistor is coupled to a second input end of the input stage.

14. The receiver of claim 13, wherein the input stage further comprises:
a first capacitor having a first end coupled to the first input end of the input stage;
a second capacitor having a first end coupled to the second input end of the input stage;
a seventh switch having a first end and a second end respectively coupled to a second end of the first capacitor and the control end of the first redundant transistor; and
an eighth switch having a first end and a second end respectively coupled to a second end of the second capacitor and the control end of the second redundant transistor.

15. The receiver of claim 14, wherein the seventh switch and the eighth switch are turned on when the receiver is operated in a correction period, and the seventh switch and the eighth switch are turned off when the correction period is ended.

16. The receiver of claim 9, wherein the input stage further comprises:
a first capacitor having a first end and a second end respectively coupled to a first input end of the input stage and the control end of the first input transistor;
a second capacitor having a first end and a second end respectively coupled to a second input end of the input stage and the control end of the second input transistor;
a seventh switch having a first end and a second end respectively coupled to the control end of the first input transistor and a third voltage; and
an eighth switch having a first end and a second end respectively coupled to the control end of the second input transistor and the third voltage.

17. The receiver of claim 16, wherein the third voltage is a common mode voltage.

18. The receiver of claim 16, wherein the seventh switch and the eighth switch are turned off when the receiver is operated in a correction period, and the seventh switch and the eighth switch are turned on when the correction period is ended.

19. An automatic offset cancellation (AOC) method, comprising:
generating an equalized differential signal according to an input differential signal by a receiving channel circuit, wherein the equalized differential signal comprises an equalized first-end signal and an equalized second-end signal;
detecting a peak of the equalized first-end signal by an AOC circuit to generate a first peak detection result;
detecting a peak of the equalized second-end signal by the AOC circuit to generate a second peak detection result;
comparing the first peak detection result with the second peak detection result by the AOC circuit to generate a comparison result; and
compensating a mismatch of an input differential pair in the receiving channel circuit according to the comparison result by the AOC circuit.

20. The AOC method of claim 19, wherein the input differential pair is an input transistor pair in an input stage of an equalization filter of the receiving channel circuit.

21. The AOC method of claim 19, wherein the input differential pair comprises a first input transistor and a second input transistor, and the AOC method further comprises:
choosing to compensate a bias current of the first input transistor or the second input transistor according to the comparison result, so as to compensate a mismatch of the input differential pair.

22. The AOC method of claim 21, further comprising:
increasing a bias current of the first input transistor when the comparison result indicates the first peak detection result is greater than the second peak detection result; and
increasing a bias current of the second input transistor when the comparison result indicates the first peak detection result is less than the second peak detection result.

23. A receiver, comprising:
a receiving channel circuit configured to generate an equalized differential signal according to an input differential signal; and
an automatic offset cancellation (AOC) circuit coupled to the receiving channel circuit to receive the equalized differential signal, wherein the equalized differential signal comprises an equalized first-end signal and an equalized second-end signal, the AOC circuit compares the equalized first-end signal and the equalized second-end signal to generate a comparison result, the AOC circuit compensates a mismatch of an input transistor pair in an input stage of an equalization filter of the receiving channel circuit according to the comparison result, the input transistor pair comprises a first input transistor and a second input transistor, and the input stage further comprises:
a first redundant transistor having a first end and a second end respectively coupled to a first end and a second end of the first input transistor;
a second redundant transistor having a first end and a second end respectively coupled to a first end and a second end of the second input transistor;
a first switch having a first end and a second end respectively coupled to a control end of the first input transistor and a first voltage;

a second switch having a first end and a second end respectively coupled to a control end of the second input transistor and the first voltage;
   a third switch having a first end and a second end respectively coupled to a control end of the first redundant transistor and the first voltage;
   a fourth switch having a first end and a second end respectively coupled to the control end of the first redundant transistor and a second voltage;
   a fifth switch having a first end and a second end respectively coupled to a control end of the second redundant transistor and the first voltage; and
   a sixth switch having a first end and a second end respectively coupled to the control end of the second redundant transistor and the second voltage.

24. The receiver of claim 23, wherein the second voltage is a ground voltage or a common mode voltage.

25. The receiver of claim 23, wherein the third switch and the fifth switch are turned off and the first switch, the second switch, the fourth switch, and the sixth switch are turned on when the receiver is operated in a correction period, and the third switch and the fifth switch are turned on and the first switch, the second switch, the fourth switch, and the sixth switch are turned off when the correction period is ended.

26. The receiver of claim 23, wherein the input stage further comprises:
   a first current source coupled to the first end of the first input transistor;
   a second current source coupled to the first end of the second input transistor;
   a variable capacitor having a first end and a second end respectively coupled to the first end of the first input transistor and the first end of the second input transistor;
   a variable resistor having a first end and a second end respectively coupled to the first end of the first input transistor and the first end of the second input transistor;
   a first resistor having a first end and a second end respectively coupled to the second end of the first input transistor and a third voltage; and
   a second resistor having a first end and a second end respectively coupled to the second end of the second input transistor and the third voltage.

27. The receiver of claim 23, wherein the control end of the first input transistor is coupled to a first input end of the input stage, and the control end of the second input transistor is coupled to a second input end of the input stage.

28. The receiver of claim 27, wherein the input stage further comprises:
   a first capacitor having a first end coupled to the first input end of the input stage;
   a second capacitor having a first end coupled to the second input end of the input stage;
   a seventh switch having a first end and a second end respectively coupled to a second end of the first capacitor and the control end of the first redundant transistor; and
   an eighth switch having a first end and a second end respectively coupled to a second end of the second capacitor and the control end of the second redundant transistor.

29. The receiver of claim 28, wherein the seventh switch and the eighth switch are turned on when the receiver is operated in a correction period, and the seventh switch and the eighth switch are turned off when the correction period is ended.

30. The receiver of claim 23, wherein the input stage further comprises:
   a first capacitor having a first end and a second end respectively coupled to a first input end of the input stage and the control end of the first input transistor;
   a second capacitor having a first end and a second end respectively coupled to a second input end of the input stage and the control end of the second input transistor;
   a seventh switch having a first end and a second end respectively coupled to the control end of the first input transistor and a third voltage; and
   an eighth switch having a first end and a second end respectively coupled to the control end of the second input transistor and the third voltage.

31. The receiver of claim 30, wherein the third voltage is a common mode voltage.

32. The receiver of claim 30, wherein the seventh switch and the eighth switch are turned off when the receiver is operated in a correction period, and the seventh switch and the eighth switch are turned on when the correction period is ended.

* * * * *